No. 12,354. REISSUED JUNE 6, 1905.

A. J. FRITH.

BUCKET CONVEYER.

APPLICATION FILED SEPT. 30, 1901.

4 SHEETS—SHEET 1.

Witnesses:
Albert E. Williams Jr.
R. B. Cavanagh

Inventor
A. J. FRITH
by H. H. Bliss
his Attorney.

No. 12,354.

REISSUED JUNE 6, 1905.

A. J. FRITH.

BUCKET CONVEYER.

APPLICATION FILED SEPT. 30, 1901.

4 SHEETS—SHEET 2.

Witnesses
Albert E. Williams, Jr.
R. B. Cavanagh.

Inventor,
A. J. FRITH
by H. H. Bliss,
his Attorney.

No. 12,354. REISSUED JUNE 6, 1905.
A. J. FRITH.
BUCKET CONVEYER.
APPLICATION FILED SEPT. 30, 1901.
4 SHEETS—SHEET 3.
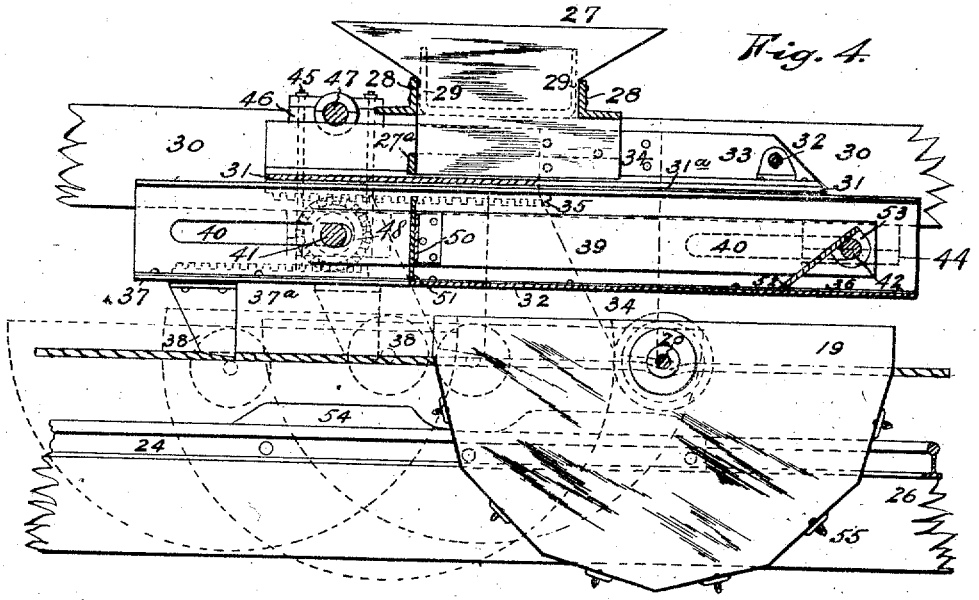
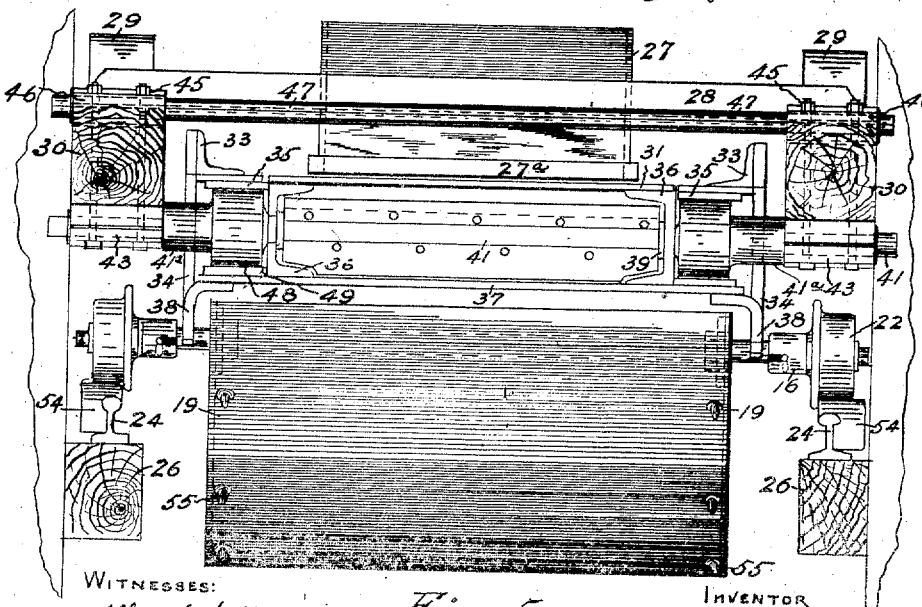
Fig. 5
WITNESSES:
Albert K. Williams, Jr.
R. B. Carmaghi
INVENTOR
A. J. FRITH,
by H. H. Bliss,
his ATTORNEY.

No. 12,354.

REISSUED JUNE 6, 1905.

A. J. FRITH.

BUCKET CONVEYER.

APPLICATION FILED SEPT. 30, 1901.

4 SHEETS—SHEET 4.

Witnesses:
A.K. Williams Jr.
R. B. Carmagh

Inventor
A. J. FRITH
by H. H. Bliss,
his ATTORNEY.

No. 12,354. Reissued June 6, 1905.

UNITED STATES PATENT OFFICE.

ARTHUR J. FRITH, OF NEW YORK, N. Y., ASSIGNOR OF ONE-HALF TO TRENTON IRON COMPANY, A CORPORATION OF NEW JERSEY.

BUCKET CONVEYER.

SPECIFICATION forming part of Reissued Letters Patent No. 12,354, dated June 6, 1905.

Original No. 570,251, dated October 27, 1896. Application for reissue filed September 30, 1901. Serial No. 77,062.

*To all whom it may concern:*

Be it known that I, ARTHUR J. FRITH, a citizen of the United States, residing at New York, in the county of New York and State of New York, have invented new and useful Improvements in Bucket Conveyers, of which the following is a specification.

The object of the invention is to provide a conveyer having gravity-buckets driven by endless ropes or chains, which buckets shall be automatically loaded at one level and discharged at another level as long as power is supplied to cause the traverse of the buckets.

The invention will first be described in detail and then particularly set forth in the claims.

Figure 1:
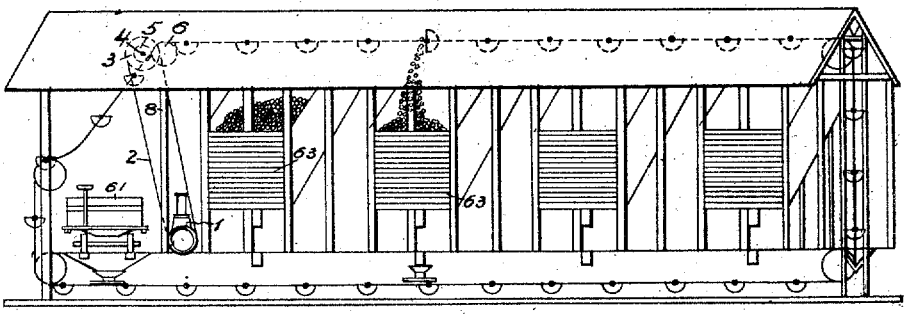
Figure 3:
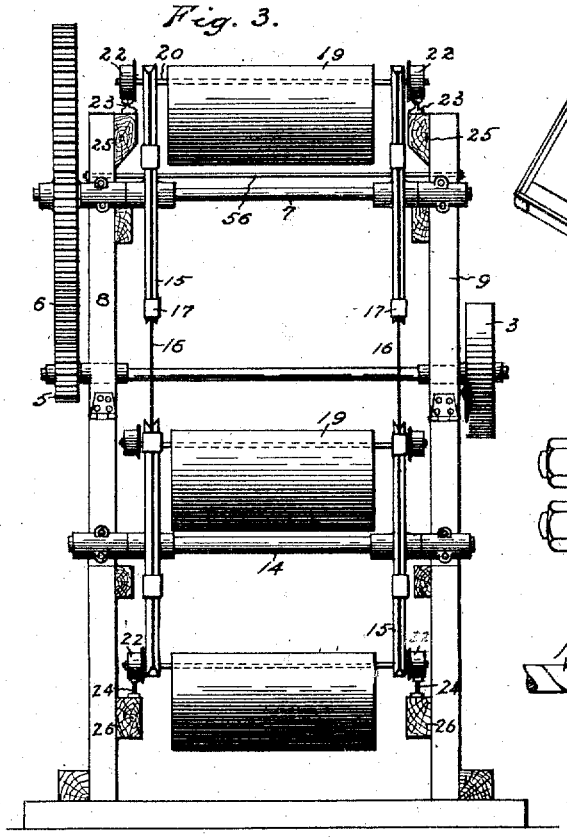
Figure 6:
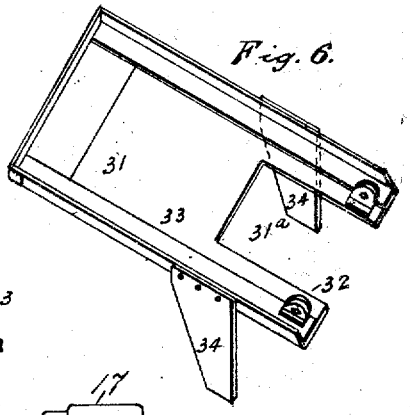
Figure 8:
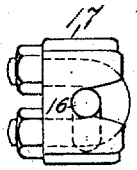
Figure 7:
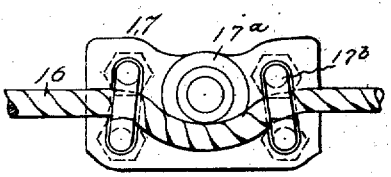
Figure 2:
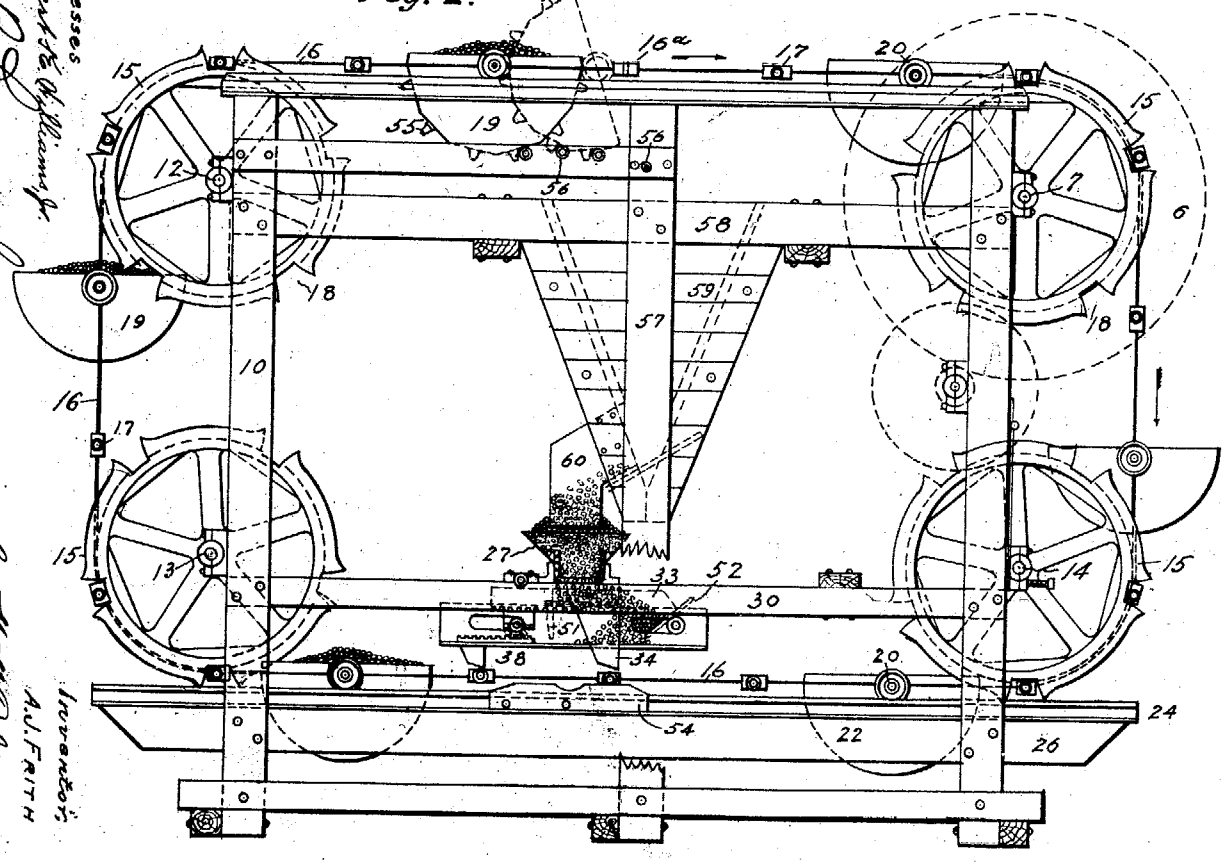
Figure 9:
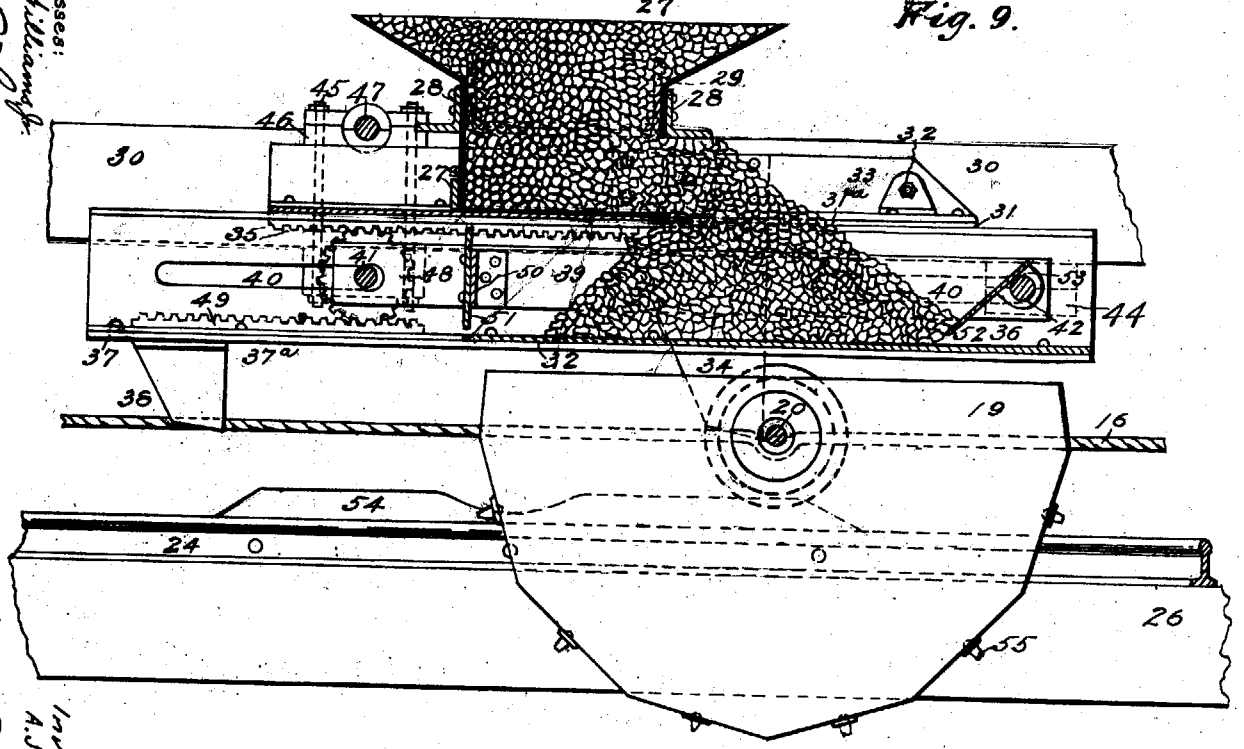

In the accompanying drawings, Figure 1 shows, more or less in outline, a general diagrammatic view of a storage plant for coal to which my invention is shown applied. Fig. 2 is a side elevation of my conveyer, enlarged, showing more in detail the principle of the means employed for driving, loading, and unloading the gravity-buckets. Fig. 3 is an end view of Fig. 2, the loading and storage apparatus being omitted. Fig. 4 is a central sectional side elevation of the loading mechanism and its supports. Fig. 5 is an end elevation of the loading apparatus. Fig. 6 is a perspective view of a detail of construction hereinafter described. Figs. 7 and 8 are a side and end view, respectively, of another detail of construction hereinafter described. Fig. 9 is an enlargement of Fig. 4 and of such parts of Fig. 1 as illustrate the manner of the downward passing of the material from the hopper.

In said figures the several parts are indicated by reference-numbers, as below described, like numbers indicating like parts in the several figures.

1 indicates a steam or any other suitable engine, Fig. 1, connected by a belt 2 to a pulley 3, mounted on a shaft 4, suitably journaled in bearings in vertical end frames of the plant. The pinion 5 on the shaft 4 meshes with the gear-wheel 6, which, together with a pair of sprocket-wheels 15, is mounted on a shaft 7, suitably journaled in bearings in the same end frames 8 9. In said frames and in opposite end frames 10 are suitably journaled in bearings shafts 12, 13, and 14, carrying each a pair of sprocket-wheels 15. Over said sprocket-wheels the endless wire rope 16 passes, provided with a joint-piece $16^a$ of any suitable construction and with metal clamps or stops 17 of special construction hereinafter described, which stops engage in the recesses 18 between the sprockets or teeth in the sprocket-wheels 15. At suitable intervals apart, having a space between them preferably greater than the length of each bucket, are secured to the wire rope gravity-buckets 19, suspended on suitable shafts 20, hung in the stops or clamps 17, which shafts are provided with truck-wheels 22, which run on upper tracks 23 on longitudinal timbers or frames 25 and on lower tracks 24 on longitudinal timbers or frames 26.

27, Figs. 4 and 5, indicates a hopper or chute placed at any suitable point above and in line with the lower travel of the buckets 19. Said hopper or chute has riveted thereto the angle-irons 28, which rest upon and transfer the weight of the hopper to the longitudinal timbers or frames 30, the channel-pieces 29, bolted to said timbers between the ends of the angle-irons 28, preventing any sliding motion of the hopper. Said hopper, however, is free to move vertically should occasion require. The bottom edge of the hopper is provided with a stiffening-strap of metal $27^a$. Below said hopper, disconnected entirely therefrom, is a sliding plate 31, provided with an opening therethrough, $31^a$. Said plate is hinged to side angle-irons 33 of suitable depth, as shown at 32. To said angle-irons are riveted the long toes 34. Secured to the under side of the angle-irons 33 are the tooth-racks 35. Between said racks are longitudinal channel-irons 36, on whose upper flanges the plate 31 may slide, but whose lower flanges are riveted to another plate, 37, provided with an opening $37^a$, which plate and channel-irons 36 slide together. To the bottom of the plate 37 are riveted the short toes 38, said plate and the plate 31 forming a two-part reciprocating valve. Suspended on the shafts 41 42, closing the slots 40 in the webs of the side channel-irons 36, through which slots said shafts pass, are two flat bars 39. The shaft 42 is secured by hangers 44 (shown in dotted lines) to the frame 30, Fig. 4, and its fellow frame behind it. The shaft 41 is secured at each end in bearings or hangers 43, Fig. 5, secured by bolts 45 to the bottoms of frames 30, and said bolts also secure to the tops of said frames the caps 46 of a shaft 47, whose use will be hereinafter explained. On the shaft 41, provided with collars 41ª, are the pinions 48, in mesh with the toothed racks 35 and 49, the latter rack secured to the plate 37. To the bars 39 is riveted cross-bar 50, to which is secured a flexible stop or end piece 51, of rubber or other suitable material. An end piece 52, of suitable cast metal, is supported between the bars 39 by lugs 53, which are supported on the shaft 42.

On the rails 24 are secured short castings forming elevating-rails 54 in the nature of stationary cams, which elevate the buckets 19 when their truck-wheels 22 mount said castings. The buckets 19 are provided on their semicircular bottoms with points or teeth 55 in two lines, which teeth come in contact with the rack-rods 56 in the frame of the plant. Each bucket thus becomes practically a gear-wheel turned on its shaft by the rack-rods 56.

Fig. 6 shows in perspective the plate 31 detached. The hinges 32 unite said plate to the bottom flanges of the angle-irons 33, as is clearly shown in said Fig. 6.

Fig. 7 shows a side view, and Fig. 8 an end view, looking from the left of Fig. 7, of one of the stops or clamps 17, which figures show the construction and method of securing said stops to the wire rope 16. A piece of gas-pipe 17ª is secured within the stop which is cast around it. Through the hole in this gas-pipe is passed each shaft 20 of the buckets 19. This suspends the gravity-bucket to the wire rope 16, to which the stop is firmly secured, so that it cannot slide, by means of a curved groove in the stop, in which a bight in the rope 16 is embedded, as shown in Fig. 7. Two U-bolts 17ᵇ, provided with nuts on their ends, may, if desired, be inserted in the stop at each side of the hole 17ª, so as to prevent the rope from jumping out of the curved groove laterally under the influence of some accidentally and laterally applied force.

The operation of the conveyer after it has been started by the engine 1 is continuous, the loading and unloading of the buckets being automatically effected as they travel from the lower level to the higher, as shown in the diagram of general operations, Fig. 1. The operation in detail can be best understood by referring to Figs. 2, 4, and 5. Assuming the line of buckets to be traveling in the direction of the arrow, Fig. 2, when a bucket reaches the short rail 54 on the rail 24 the bucket-wheels 22 mount said short rail, which elevates the bucket so that its shaft 20 comes in contact with the toe 34, secured to the sides of the plate 31. This moves said plate to the left and brings its opening 31ª under the hopper 27. The rack 35 moves with the plate 31 and causes the pinion 48 to rotate, which rotation throws the plate 37 to the right by means of the rack 49, secured to said plate. This movement brings the opening 37ª in the plate 37 under the opening 31ª in the plate 31. There is thus left a continuous, clear, and open passage for the material in the hopper 27 to run directly down through said openings into the bucket under the same, the plates 31 37 acting as a reciprocating valve. As the bucket continues to travel the shaft 20 comes in contact with the toe 38 on the plate 37 and moving the said plate to the left closes the passage between the chute and the bucket, and simultaneously the rack 47 rotates the pinion 48 in mesh with the rack 35 on the plate 31. This motion throws the plate 31 to the right, and thus closes its opening 31ª, so that the material in the chute is thus cut off by the movement of the valve formed by these two plates, and the loaded bucket passes on its travel until it ascends and passes upon the upper horizontal rails 23. By examining Fig. 9 it will be seen that when either of the valves or horizontal supporting-plates for the material are in their closed position the coal or other material is not when at rest confined on all sides by vertical walls against which it presses, but that above each valve or sliding plate there is an unobstructed clearance-way, which permits the material to reach a position of natural rest. As shown in Fig. 1, the material resting on the valve 31 can press laterally through an opening in the bottom of the hopper, so that the extreme outer surface of this part of the mass is inclined, as shown in said Fig. 9, the hopper being left open on one side immediately above the valve to allow an easement for the mass at that side. Similarly, as shown in Fig. 9, the mass at rest upon the valve or plate 32 does not press against a rigid confining-wall, but is allowed to assume a position of natural repose. Consequently the tendency for breakage of the parts is overcome, it being well known that there is danger of such breakage if the valve at the bottom of the hopper and the hopper-bottom itself are so constructed and related that when the downward passage of the material is arrested the lower part of the mass is surrounded on all sides by rigid retaining-walls against which the material presses. When the teeth 55 on the bottom of the bucket come in contact with the rack-rods 56, the bucket is turned half over or partially upset and discharges its contents into any suitable receptacle below, such as a hopper 59, or in loading-pockets, such as 63. (Shown in Fig. 1.) When said loading-pockets are filled, they may over-flow and fill up the house or shed within which they are formed, or said pockets may be discharged through chutes in the sides of the building into carts or vehicles on the outside of the building.

In Fig. 1 a car 61 is shown over a hopper, into which it may discharge. The loading device hereinbefore described being under said hopper, the line of the buckets in their travel may receive the contents of the car and transfer it, as already described, to the hopper or other receptacle at a higher elevation. When a bucket is filled from any source, as from the car 61, it may pass while still loaded successively under any other loading devices without interfering with or operating them by the simple detachment of the short rails or castings 54. The bucket will thus not be elevated, but move along on the horizontal rails 24, and when it reaches its discharging-point will be unloaded.

The plate 52 on the shaft 42 serves to form a closed end to the sliding plate 37, and the flexible stop or end piece 51 forms the opposite end of the sliding plate 37 and its flat bars 39. The object of this flexible end piece is to prevent choking of the loading device or danger of scattering the coal between the buckets. With this flexible piece, a piece of coal or other solid material may escape under said flexible end piece, when it will fall into one of the buckets, and no jamming or breaking of any part of the loading apparatus will take place. Other means are also provided to prevent the clogging of the loading device. The hopper 27 is free to rise from its support on the timber 30, and the plate 31 is also capable of turning on its hinges 32, secured to its side angle-irons 33, as shown in Fig. 6. The shaft 47 over one end of the angle-irons 33 serves to hold down the same and its racks 35 in mesh with the pinions 48. The shafts 41 42 act as guides within the slots 40, which slots permit the plate 37 to be reciprocated to and fro. The upper plate 31 may be dispensed with; but the to-and-fro motion of the two plates 31 and 37 will cut the stream of falling material—such as coal, for instance—with less liability of jamming than a single plate or valve.

In Fig. 2, for convenience of illustration, the chute 60 and hopper 27 are shown discharging back into the same line of buckets which unload into the hopper 59, which may be secured within the frames 57 58, and from which hopper the chute 60 leads. A bucket is thus continuously loaded from and discharged into the same receptacle; but in practice, of course, the loading and discharging may take place from and to any suitable different points, as illustrated in general design in the diagram Fig. 1.

It will be observed that the chute 60 and hopper 27, as related to each other by the capability of the hopper's rising to an obstruction, form practically a slip-joint in a pipe, through which the coal or other material passes.

There is much advantage in the use of widely-spaced buckets instead of a continuous series of buckets.

The use of a continuous series of buckets involves a continuous line of loads and in the vertical reaches of a system of conveyers necessarily entails a heavy strain upon the conveyer-chains. Hence such conveyers must be made very heavy and expensive. There is also a maximum speed, at which speed only such conveyers can be economically operated. A continuous bucket conveyer at this speed has an enormous capacity, which is frequently not desired, and such capacity can be reduced only by the use of unduly small buckets or by reducing the speed, thus leaving the same cost and strains as in a machine of greater capacity. This is particularly so in long and lofty lines where the cost frequently becomes prohibitive; but a system of conveyers with buckets having considerable spaces between each bucket reduces the strain both on chains and framing in direct proportion to the length of the spaces, and the cost of the machine is reduced in like proportion. Also in a conveyer with buckets spaced apart the maximum speed of travel of bucket can be always maintained and the largest and most economical size of bucket may be used, and the capacity of delivery is regulated by using a small number of buckets, which method involves less strain and the least possible expense, while if an extra capacity be desired a few additional buckets may be added at any time.

The use of gritty material—such as sand, coke, or ashes—is particularly destructive to the sliding parts of all chains. In this particular a wire rope is especially durable as well as being markedly lighter for the same strength.

Having thus fully described my invention, I claim—

1. In a bucket conveyer, the combination of the following-named elements; horizontal rails; gravity-buckets suspended between said flexible connections; wheels for supporting said buckets on said rails; a stationary hopper or chute a reciprocating valve located beneath the mouth of said chute, and above said bucket's line of travel; and toes or projections connected to said valve and adapted to be struck by each of the traveling buckets; whereby said valve is reciprocated positively in one direction to load each bucket in turn, and positively in the opposite direction to cut off the supply of material when the bucket has been loaded.

2. In a bucket conveyer, the combination of the following-named elements; traveling gravity-buckets; a hopper or chute; a bucket-loader having two movable members; and means for reciprocating both of said members; whereby when said members are reciprocated, the buckets are loaded with material from the chute, and the supply of material is cut off from the buckets when loaded.

3. In a bucket conveyer, having traveling gravity-buckets, in combination with a hopper or chute, means for automatically loading said buckets, consisting of a loading device having a top plate and a bottom plate, and means for reciprocating said plates, through which plates the supply of material is run into the buckets, and cut off therefrom, by said plates, when the buckets are loaded.

4. In a bucket conveyer, having traveling gravity-buckets in combination with a hopper or chute, means for automatically loading said buckets, consisting of a loading device having a top plate and a bottom plate and an interposed rack-and-pinion gearing for reciprocating said plates, whereby said plates are caused to open and close at the proper times to load each bucket in succession with material from said chute.

5. In a bucket conveyer, having traveling gravity-buckets, in combination with a hopper or chute, means for automatically loading said buckets, consisting of a reciprocating bucket-loader provided with a plate hinged thereto, as and for the purposes set forth.

6. In a gravity-bucket conveyer, the combination of a bucket-loader and a yielding stop or piece for preventing choking of said loader.

7. In a bucket conveyer, in combination with a reciprocating bucket-loader having a loading-plate, a flexible or yielding end piece or stop, as and for the purposes set forth.

8. In a gravity-bucket conveyer, the combination of a bucket-loader and a vertically-movable hopper or chute, for the purposes set forth.

9. In a gravity-bucket conveyer, the combination of a bucket-loader, a yielding stop or piece, and a vertically-movable hopper or chute, for the purposes set forth.

10. In a gravity-bucket conveyer, the combination of the following-named elements: endless flexible connections; horizontal rails; gravity-buckets suspended between said flexible connections; wheels for supporting said buckets on said rails; a stationary supply source of material; a bucket-loader, located outside of the line of buckets, and beneath said source of supply; means connected with the conveyer for horizontally reciprocating said bucket-loader positively in each direction; and a yielding piece for preventing choking of said loader.

11. In a bucket conveyer, the combination of traveling gravity-buckets, a bucket-loader, and short rails, or castings superposed on track-rails, whereby said buckets are elevated to operate the bucket-loader, substantially as described.

12. In a bucket conveyer, the combination of traveling gravity-buckets and a reciprocating bucket-loader provided with toes, as 34, 38, whereby the bucket-loader is adapted to be reciprocated as each bucket travels past the same.

13. In a bucket conveyer, the combination of traveling gravity-buckets; a reciprocating bucket-loader, provided with toes, as 34, 38; and short rails or castings superposed on track-rails, whereby said buckets are elevated to operate the bucket-loader.

14. In a conveyer, the combination with a traveling wire rope of a metal stop or clamp formed in one piece and provided with a curved groove in one of its surfaces, by means of which, and a bight in said rope within said groove, the stop or clamp is secured to the rope.

15. In a bucket conveyer, the combination of an endless traveling wire rope; a metal stop or clamp formed in one piece, and provided with a curved groove in one of its surfaces, by means of which, and a bight in said rope within said groove, the stop or clamp is secured to the rope; and a traveling bucket suspended to said rope by said clamp.

16. In a bucket conveyer, the combination of an endless traveling wire rope, a traveling bucket; and a metal stop or clamp, for suspending said bucket to said rope, formed in one piece, and provided with a curved groove in one of its surfaces, and with bolts, by means of which groove and bolts and a bight in said rope within said groove, the stop or clamp is secured to the rope so as to prevent slippage of the clamp.

17. In a gravity-bucket conveyer, the combination of an endless traveling wire rope, a traveling bucket; and a metal stop or clamp for suspending said bucket to said rope formed in one piece and having a hole therethrough for the shaft of the bucket, said stop or clamp being also provided with a curved groove in one of its surfaces, and with a bolt at each side of said hole, by means of which groove and bolts and a bight in said rope within said groove, the clamp is secured to the rope so as to prevent slippage of the clamp and lateral displacement of the rope from the clamp.

18. The combination of a hopper in which material can accumulate, having an opening in the front of said hopper at the bottom thereof, a conveyer under the hopper, a reciprocating plate between the hopper and the conveyer and extending beyond the opening in the front of the hopper, and means for reciprocating the plate so as to cause a predetermined amount of material to be intermittently discharged from the hopper onto the plate and from the end of the plate onto the conveyer at each reciprocation of the plate, substantially as described.

19. The combination of a hopper, having an opening in the front and bottom, a reciprocating plate directly under that portion of the opening at the bottom, and means for intermittently reciprocating the plate, whereby a predetermined amount of material is drawn from the hopper and discharged over the edge of the plate, substantially as described.

20. The combination of a hopper open in front, a continuously-moving conveyer mounted under the hopper, a reciprocating part mounted between the hopper and the conveyer, and means for reciprocating said part in time with the movement of the conveyer, so that the material will be drawn from the hopper and discharged from the part as each bucket of the conveyer is presented, substantially as described.

21. An automatic feeding device for conveyers, comprising a receptacle adapted to receive the material to be fed and provided with a discharge-opening, a reciprocating part interposed between said discharge-opening and the conveyer and separated from the discharge-opening by a space, said part adapted to receive the material after it passes through said opening, and means for reciprocating said part at predetermined times so as to feed the material to the conveyer.

22. A feeding device, comprising a receptacle adapted to contain the material to be fed, and having a discharge-opening therein, a substantially horizontal movable piece below said opening in a plane at an angle to the plane of said opening, so that it does not directly control it, said piece adapted to receive the material passing through the discharge-opening and check the flow thereof, and means for moving said piece so as to permit a portion of the material supported thereby to be discharged therefrom.

23. In a feeding device, the combination with a receptacle provided with a discharge-opening, of a movable part placed below the opening in a plane at an angle to the plane of said opening, separated therefrom by a space, said part adapted to receive the material so as to limit the flow through said discharge-opening, and means for moving said part from beneath a portion of the material so as to produce a gradual feed thereof.

24. The combination with a conveyer, of a feeding device comprising a receptacle in which the material is contained, provided with a discharge-opening, a reciprocating part interposed between the receptacle and the conveyer and located entirely out of the path of said conveyer, said part separated from the discharge-opening by a space and adapted to receive the material from the receptacle and check the discharge, and means for moving said movable part so as to permit said material to be gradually fed into the conveyer.

In testimony whereof I have hereunto signed my name, in the presence of two witnesses, this 3d day of September, 1901.

ARTHUR J. FRITH.

Witnesses:

EPHRAIM KOLLMYER,
JOHN J. WRIGHT.